US012054975B2

(12) United States Patent
Sampson

(10) Patent No.: US 12,054,975 B2
(45) Date of Patent: Aug. 6, 2024

(54) HINGE ASSEMBLY FOR A SECURITY DOOR

(71) Applicant: United States Bullet Proofing, Inc., Upper Marlboro, MD (US)

(72) Inventor: Kenneth Sampson, Crownsville, MD (US)

(73) Assignee: United States Bullet Proofing, Inc., Upper Marlboro, MD (US)

( * ) Notice: Subject to any disclaimer, the term of this patent is extended or adjusted under 35 U.S.C. 154(b) by 116 days.

(21) Appl. No.: 17/851,098

(22) Filed: Jun. 28, 2022

(65) Prior Publication Data

US 2023/0056621 A1 Feb. 23, 2023

Related U.S. Application Data

(60) Provisional application No. 63/234,484, filed on Aug. 18, 2021.

(51) Int. Cl.

| | |
|---|---|
| ***E05D 11/00*** | (2006.01) |
| ***E05D 3/02*** | (2006.01) |
| ***E05D 5/12*** | (2006.01) |
| *E05D 5/10* | (2006.01) |

(52) U.S. Cl.

CPC ............ *E05D 11/0018* (2013.01); *E05D 3/02* (2013.01); *E05D 5/128* (2013.01); *E05D 11/0054* (2013.01); *E05D 2005/102* (2013.01)

(58) Field of Classification Search

CPC ....... E05D 11/0018; E05D 3/02; E05D 5/128; E05D 11/0054; E05D 2005/102; E05Y 2900/132

See application file for complete search history.

(56) References Cited

U.S. PATENT DOCUMENTS

| | | | | | |
|---|---|---|---|---|---|
| 547,435 | A * | 10/1895 | Holland | E05D 5/128 16/381 |
| 4,116,514 | A * | 9/1978 | Lawrence | E05D 11/0081 439/31 |
| 4,288,944 | A * | 9/1981 | Donovan | E05C 9/042 70/276 |

(Continued)

OTHER PUBLICATIONS

Brookfield Industries, Item # I-8513 (countersunk holes), Full Mortise, https://catalog.bfimfg.com/item/hinges-series-i/i8510-i8513-2000-lbs-capacity/i-8513-countersunk-holes, dated Aug. 17, 2015.

*Primary Examiner* — Christine M Mills
*Assistant Examiner* — Matthew J Sullivan
(74) *Attorney, Agent, or Firm* — Matthew Cox; Holland & Knight, LLP

(57) ABSTRACT

A security door assembly is disclosed including a hinge assembly having a first hinge plate having at least a first hinge pin receptacle extending from the first hinge plate, and a second hinge plate having at least a second hinge pin receptacle extending from the second hinge plate. A hinge pin is removably received in a longitudinal direction within the first and second hinge pin receptacles such that the first and second hinge plates are pivotal with respect to one another via the hinge pin. The hinge assembly includes a bearing assembly disposed between the hinge pin and one of the first or second hinge pin receptacles, and a retention member removably extending in a first lateral direction into one of the first or second hinge pin receptacles and engaging the hinge pin.

20 Claims, 5 Drawing Sheets

(56) References Cited

U.S. PATENT DOCUMENTS

| | | | | | |
|---|---|---|---|---|---|
| 4,475,266 | A * | 10/1984 | Suska | E05D 5/14 16/386 |
| 5,048,155 | A * | 9/1991 | Hwang | E05F 1/1215 16/301 |
| 5,855,040 | A * | 1/1999 | Lin | E05D 5/10 16/50 |
| 6,804,862 | B2 * | 10/2004 | Miller | E05D 5/10 16/386 |
| 7,162,774 | B1 * | 1/2007 | Von Resch | E05D 7/0054 16/236 |
| 7,343,644 | B2 * | 3/2008 | Elmer | E05D 11/0018 16/229 |
| 7,971,319 | B2 * | 7/2011 | Becker | E05D 11/1078 16/334 |
| 8,955,194 | B2 * | 2/2015 | Teta | E05F 1/006 16/222 |
| 9,194,166 | B1 * | 11/2015 | Spiegel | E05D 3/02 |
| 9,617,772 | B1 * | 4/2017 | Chen | E05F 1/1016 |
| 10,626,651 | B2 * | 4/2020 | Chang | E05F 3/20 |
| 11,008,794 | B2 * | 5/2021 | Chen | F16K 15/026 |
| 11,041,335 | B2 * | 6/2021 | Chen | E05F 1/1215 |
| 2006/0156512 | A1 * | 7/2006 | Naylor | E05D 5/128 16/273 |
| 2013/0219664 | A1 * | 8/2013 | Burda | E05D 11/06 16/374 |
| 2015/0330129 | A1 * | 11/2015 | Hendrickson, Jr. | E05D 7/0027 16/244 |
| 2020/0190884 | A1 * | 6/2020 | Chen | E05F 3/08 |
| 2020/0378168 | A1 * | 12/2020 | Chen | E05F 3/12 |
| 2021/0180381 | A1 * | 6/2021 | Wu | E05F 3/20 |
| 2021/0340802 | A1 * | 11/2021 | Wu | B60R 16/03 |
| 2023/0366610 | A1 * | 11/2023 | Schneider | E05D 3/16 |

* cited by examiner

HINGE ASSEMBLY FOR A SECURITY DOOR

CROSS-REFERENCES TO RELATED APPLICATIONS

This application is a non-provisional of U.S. patent application Ser. No. 63/234,484 filed Aug. 8, 2021 entitled IMPROVED HINGE ASSEMBLY FOR A SECURITY DOOR, which is hereby incorporated by reference in its entireties.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to security doors to protect buildings from blast, ballistics, and forced entry events. Such doors may be implemented in various locations, including but limited to high security facilities such as embassy buildings, government buildings, military installations, museums, banks, police stations, school buildings, etc. Such doors are designed to withstand the forces of blasts, firearm rounds, and forced entry attempts, such as with hammers, crow bars, axes, rams, etc.

In conventional security doors, the hinge plates of hinge assemblies connecting the security door to the door frame are made from expensive and heavy duty metal, in order to be able to withstand the forces of blasts, ballistics, and forced entry events, with a hinge shaft pivotally connecting the hinge plates. In order to facilitate movement of the doors, hinges for security doors are often equipped with internal bearing and/or oil assemblies coupled to the hinge pin that allow for easier movement of the hinge plates on the hinge pin, and thus easier movement of the doors themselves.

To help prevent the hinge assemblies from damage or disassembly during a blast, ballistic or forced entry event, the hinge plates, shafts, and bearing/oil assemblies in conventional security door hinges are inseparably formed with one another such that once the hinge assembly is manufactured, the hinge plates cannot come apart without breaking or destroying the entire hinge assembly. However, often times the less expensive bearing/oil assemblies within the hinge assemblies will wear out over time before the more expensive hinge plates are damaged or need replacement. Because of the integrally formed structure of conventional security door hinges, when the internal bearing/oil assemblies need replacement the entire hinge assembly would have to be replaced at significant costs.

In some conventional hinge plates, the hinge plates and hinge pin receptacles can be machined to desired specifications and then welded together to form the hinge plate and hinge pin receptacle assembly. Once the hinge pin and bearing assemblies are received in the hinge pin receptacles, any openings in the hinge pin receptacles can be welded over, caulked over, or otherwise sealed to prevent the hinge pin and internal bearing assemblies from ever being removed from the hinge pin receptacles. Because of these manufacturing methods for conventional security door hinge assemblies, the hinge assemblies can take weeks to fabricate or manufacture, such that when a replacement is needed, it could take considerable time to receive said replacement hinge assembly, which can be a security risk if the prior hinge is compromised or not working properly, which is undesirable.

What is needed then are improvements in hinges for security doors.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present disclosure is a hinge assembly for a security door including a first hinge plate having at least a first hinge pin receptacle extending from the first hinge plate, and a second hinge plate having at least a second hinge pin receptacle extending from the second hinge plate. A hinge pin can be removably received in a longitudinal direction within the first and second hinge pin receptacles such that the first and second hinge plates are pivotal with respect to one another via the hinge pin. A bearing assembly can be disposed between the hinge pin and one of the first or second hinge pin receptacles, and a retention member can be removably extended in a first lateral direction into one of the first or second hinge pin receptacles and engaged with the hinge pin.

Another aspect of the present disclosure is a security door assembly for installation on a building having an interior and an exterior. The security door apparatus can include a door frame mountable to the building, and a security door positionable within the door frame, the security door having an interior side oriented toward the interior of the building and an exterior side oriented toward the exterior of the building when the door frame is mounted to the building and security door is positioned within the door frame. The security door assembly can include at least one hinge assembly coupled between the door frame and the interior side of the security door such that security door is pivotable on the door frame via the at least one hinge assembly between an open orientation and a closed orientation. The hinge assembly can include a first hinge plate coupled to the door frame, the first hinge plate having at least a first hinge pin receptacle extending from the first hinge plate, and a second hinge plate coupled to the security door having at least a second hinge pin receptacle extending from the second hinge plate. A hinge pin can be removably received in a longitudinal direction within the first and second hinge pin receptacles. A bearing assembly can be disposed between the hinge pin and one of the first or second hinge pin receptacles. A retention member can removably extend in a first lateral direction into one of the first or second hinge pin receptacles and engaging the hinge pin.

The removable retention member allows the hinge pin to be removably received in one of the hinge pin receptacles of the hinge plates such that the internal components, including but not limited to the bearing assembly and the hinge pin itself, can be replaced as needed without having to replace the entire hinge assembly, while still providing adequate retention forces on the connection between the hinge plates of the hinge assembly during use of the hinge assembly when installed on a security door to resist damage to or disassembly of the hinge assembly from a blast, ballistic, or forced entry event.

Numerous other objects, advantages and features of the present disclosure will be readily apparent to those of skill in the art upon a review of the following drawings and description of a preferred embodiment.

DETAILED DESCRIPTION

Figure 1:
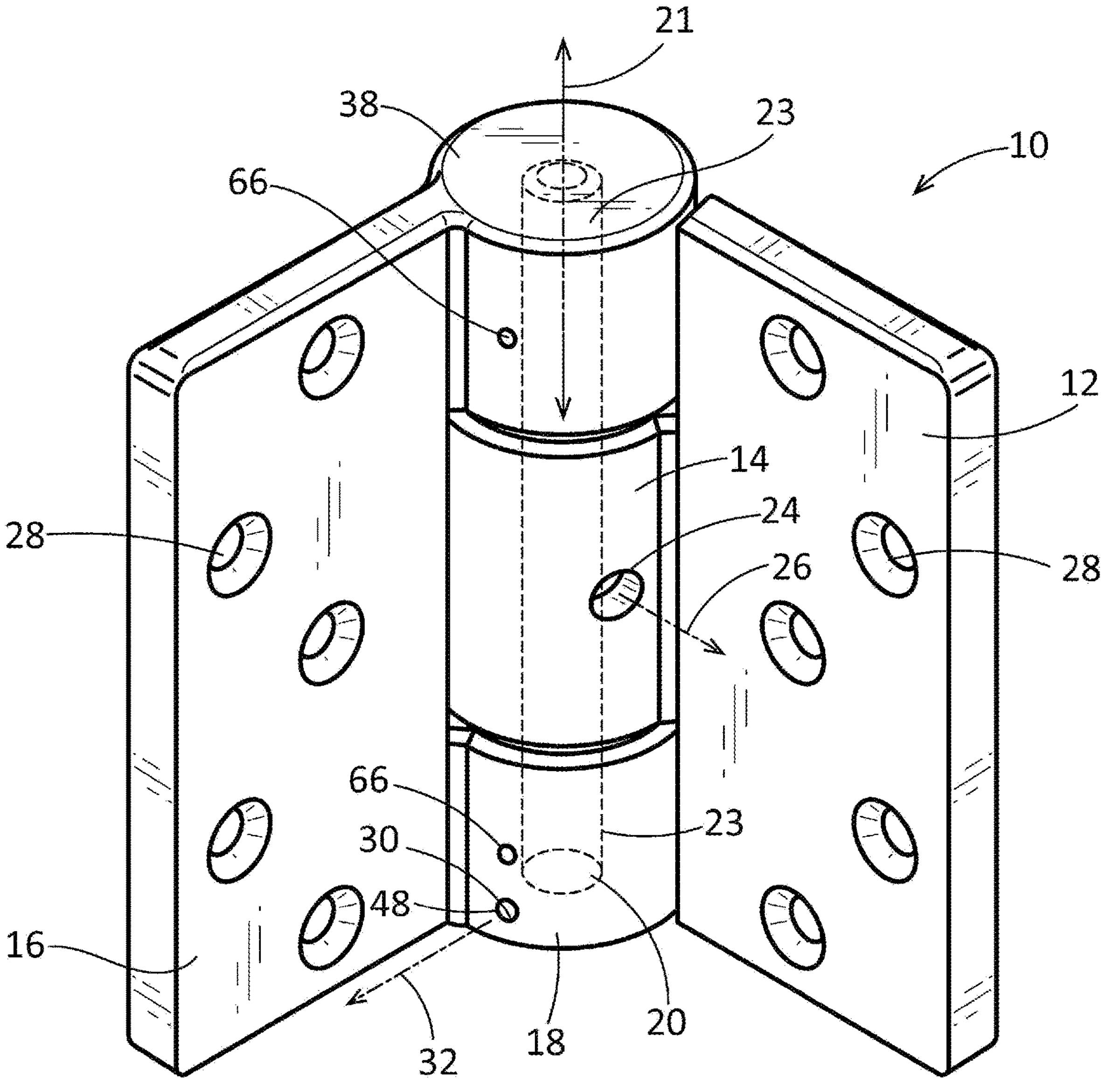
FIG. 1 is a perspective view of one embodiment of a fully assembled hinge assembly of the present disclosure.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

As shown in FIGS. 1-5, one aspect of the present disclosure is a hinge assembly 10 for a security door, the hinge assembly 10 including a first hinge plate 12 having at least a first hinge pin receptacle 14 extending from the first hinge plate 12, and a second hinge plate 16 having at least a second hinge pin receptacle 18 extending from the second hinge plate 16. A hinge pin 20 can be removably received in a longitudinal direction 21 within the first and second hinge pin receptacles 14 and 18 such that the first and second hinge plates 12 and 16 are pivotal with respect to one another via the hinge pin 20. The first and second hinge pin receptacles 14 and 18 can each include a hinge pin hole 15 which can be aligned such that the hinge pin 20 can be inserted into both hinge pin holes 15 in the first and second hinge pin receptacles 14 and 18 to pivotally connect the first and second hinge plates 12 and 16 together. A bearing assembly 22 can be disposed between the hinge pin 20 and one of the first or second hinge pin receptacles 14 and 18. The bearing assembly 22 can generally be positioned at an end 23 of the hinge pin 20 such that the hinge pin 20 can sit in the bearing assembly 22 during use to allow for easier rotation between the hinge pin 20 and the adjacent hinge pin receptacle 14 or 18. A retention member 24 can be removably extended in a first lateral direction 26 through the first or second hinge pin receptacles 14 or 18 and engaged with the hinge pin 20. In the embodiment shown in FIGS. 1-5, the first retention member 24 is shown extending through the first hinge pin receptacle 14, though in other embodiments, the first retention member 24 could extend through either the first or second hinge pin receptacles 14 or 18.

Each of the hinge plates 12 and 16 can include a plurality of apertures 28 through which screws, bolts, rivets, nails, etc. can be extended to secure the hinge plates 12 and 16 to the door and door frame respectively on a security door system. Once the hinge assembly 10 is secured to the door and door frame, the door can pivot about the door frame during use of the door via the hinge assembly 10.

The retention member 24 allows the hinge pin 20 to be removably received in the hinge pin receivers 14 and 18 in the hinge plates 12 and 16 such that the internal components, including but not limited to the bearing assembly 22 and the hinge pin 20 itself, can be replaced as needed without having to replace the entire hinge assembly 10 and the more costly hinge plates 12 and 16, while still providing retention forces at the connection between the hinge plates 12 and 16 of the hinge pin 20 to help resist damage to, or disassembly of, the hinge assembly 10 when in use due to a blast, ballistic, or forced entry event. In some embodiments, the improved hinge assemblies 10 and associated security doors can meet various industry safety standard ratings including but not limited to: for Ballistics—Department of State Rifle Ratings (7.62 and 5.56) UL 752 Levels 1-8, NIJ I, II-A, II, III-A, III, IV; for blasts—GSA, DOD (UFC), and DOS standards; and for forced entry—Department of State 5 and 15 minute ratings.

The removability of the hinge pin also allows the hinge plates 12 and 16 and the corresponding hinge pin receptacles 14 and 18 to be manufactured via a molding or casting process, as opposed to a machining process. For instance, in some embodiments, the first hinge plate 12 and the first hinge pin receptacle 14 can be integrally molded or cast together, and the second hinge plate 16 and the second hinge pin receptacle 18 can be integrally molded or cast together. An integrally molded or cast hinge plate and hinge pin receptacle can be easier and quicker to manufacture and can also provide improved or increased bi-directional strength for the corresponding hinge plate and hinge pin receptacle combinations. In some embodiments, the hinge plates 12 and 16 and corresponding hinge pin receptacles 14 and 18 can be molded or cast from a stainless steel material, though any suitable material for the hinge plates 12 and 16 and hinge pin receptacles 16 and 18 can be utilized. In still other embodiments, the hinge plates 12 and 16 and corresponding hinge receptacles 14 and 18 can be formed using more conventional machining and welding methods as used in current assembly designs, while still incorporating the removable retention member 24 and removable hinge pin 20 of the current disclosure.

In some embodiments, the hinge assembly 10 can further include a second retention member 30 removably extending in a second lateral direction 32 through one of the first or second hinge pin receptacles 14 or 18 and engaging the hinge pin 20 or another component of the hinge assembly 10 engaged with the hinge pin 20. The second retention member 30 can provide a second retention force acting on the hinge pin 20 or another component of the hinge assembly 10 engaged with the hinge pin 20 and the corresponding hinge pin receptacle 14 or 18, which can further help prevent damage or disassembly of the hinge assembly 10 from a blast, ballistic, or forced entry event.

In some embodiments, the first and second retention members 24 and 30 can be configured to engage the hinge pin 20, either directly or indirectly, from opposing sides of the hinge pin 20 to provide more balanced retention forces on the hinge pin 20.

In some embodiments, the first retention member 24 can be a dowel pin that can extend through aligned holes 34, 36 in the corresponding hinge pin receptacle 14 or 18 and the hinge pin 20 respectively, the hole 36 in the hinge pin 20 extending at least partially through the hinge pin 20. The dowel pin 30 can provide, among other things, a vertical retention force between the hinge pin 20 and the corresponding hinge pin receptacle 14 or 18 when in use, which can help prevent movement of the hinge pin 20 with respect to the hinge plates 12 and 16 during a blast, ballistic, or forced entry event. In some embodiments, the dowel pin 30 can extend completely through the hinge pin 20 and into the opposing side of the hinge pin receptacle 14 or 18, thus engaging the corresponding hinge pin receptacle 14 or 18 in two locations on either side of the hinge pin 20, to again provide for more balanced retention forces being applied on the hinge pin 20.

In some embodiments, the second retention member 30 can include a set screw which can be threadingly engaged with one of the first or second hinge pin receptacles 14 and 18 and operable to frictionally engage either the hinge pin 20 or another component of the hinge assembly 10 in contact with the hinge pin 20.

In some embodiments, the second hinge plate 16 can further include a third hinge pin receptacle 38 extending from the second hinge plate 16 in the same direction as the second hinge pin receptacle 18, the first hinge pin receptacle 14 on the first hinge plate 12 positioned between the second and third hinge pin receptacles 18 and 38. In some embodiments, the hinge assembly 10 further includes a third retention member such as a dowel pin or a set screw extending in a third lateral direction through the third hinge pin receptacle 38 and engaging the hinge pin 20, such that retention forces can be applied between the hinge pin and each of the first, second, and third hinge pin receptacles 14, 18, and 38 respectively. In some embodiments, the third lateral direction may be substantially parallel to the second lateral direction 32. The first lateral direction 26 may be oriented at an angle with respect to the second and third lateral directions 32 when the hinge plates 12 and 16 are oriented generally at a right angle with respect to each other, as shown in FIG. 1, to provide retention forces on different sides or radial directions with respect to the hinge pin 20.

In the embodiment shown in FIGS. 1-5, the first retention member 24 or dowel is shown extending through the first or middle hinge pin receptacle 14 and the hinge pin 20, and the second retention member 30 is a set screw threadingly engaged with a through hole 48 in the second hinge pin receptacle 18. In some embodiments, the second retention member 30 can be positioned to engage the hinge pin 20 directly. In other embodiments, the second retention member 30 can engage another component of the hinge assembly 10 in contact with or engaged with the hinge pin 20 such that the second retention member 30 can indirectly provide retention forces between the hinge pin 20 and a corresponding hinge pin receptacle 18.

Figure 2:
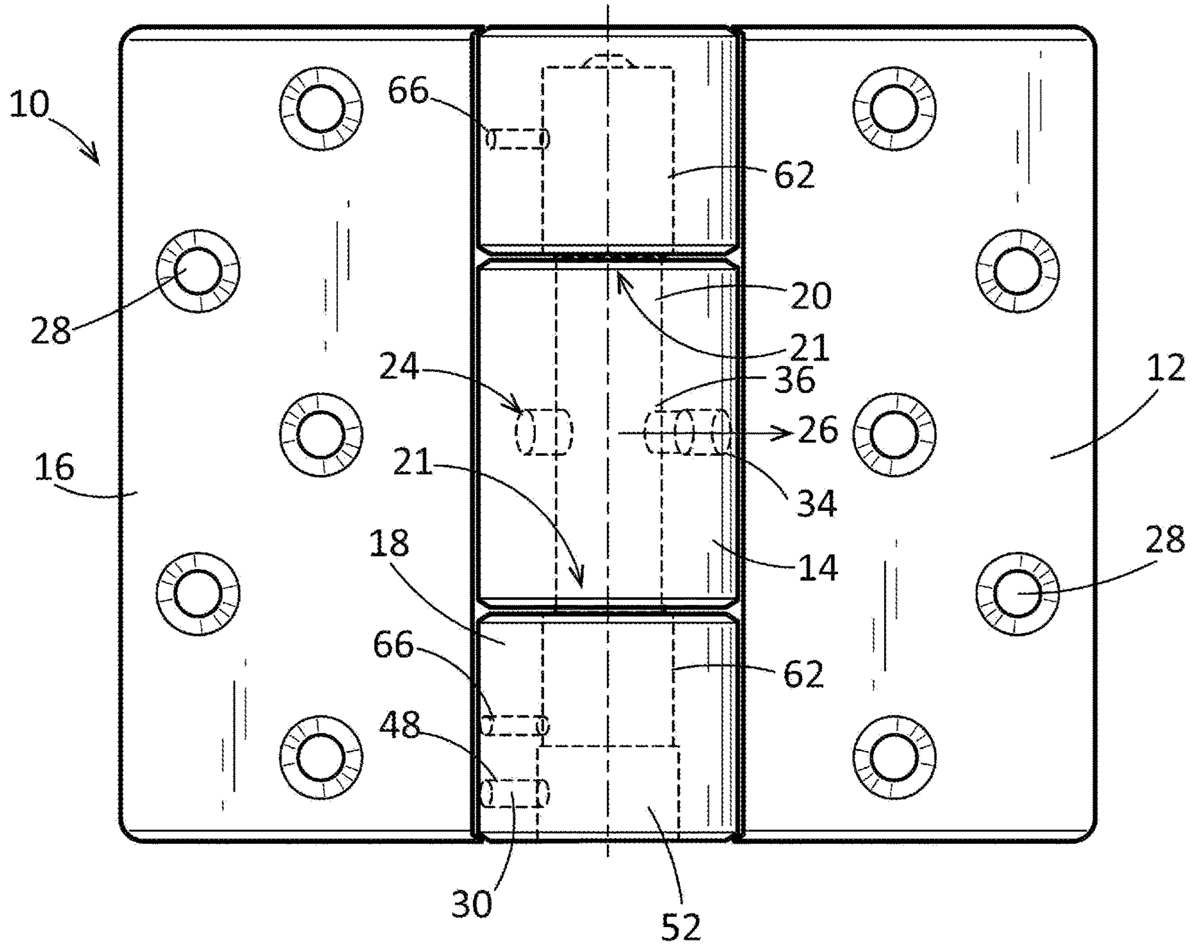
FIG. 2 is a front view of the hinge assembly of FIG. 1.

For instance, in some embodiments, one of the first or second hinge pin receptacles 14 or 18 can include an open end 50, and the hinge assembly 10 can further include a removable cap 52 engageable with the open end 50 to resist movement of the hinge pin 20 inside the first and second hinge pin receptacles 14 and 18. As shown in FIGS. 1-5, in some embodiments, the second hinge pin receptacle 18 can include the open end 50 and, and the second retention member 30 in some embodiments can be operable to be threaded through the through hole 48 in the second hinge receptacle 18 to frictionally engage the cap 52, the engagement between the cap 52 and the second retention member 30 providing a retention force indirectly on the hinge pin 20 to help prevent movement of the cap 52 within the second hinge pin receptacle 18. The second retention member 30 can also help prevent the cap 52 from unscrewing or becoming dislodged from the corresponding hinge pin receptacle during use and rotation of the hinge pin 20 within the corresponding hinge pin receptacle. In some embodiments, the cap 52 can be a threaded cap, and the open end 50 can be an at least partially threaded bore, such that the threaded cap 52 can be threadingly engaged with the open end 50 of the second hinge pin receptacle 18 to retain the hinge pin 20 within the first and second hinge pin receptacles 14 and 18. The hole 15 in the outer hinge pin receptacle opposite the cap 52 can be a blind hole (as shown for the third hinge pin receptacle 38) such that the hinge pin 20 is retained between the cap 52 and the opposing hinge pin receptacle 38, as shown in FIG. 2.

An added benefit of a threaded removable cap 52 is that the position of the cap 52 can be adjustable within the threaded end of the hinge receptacle in which the cap 52 is disposed. For instance, if the internal bearings wear out over time causing the hinge pin 20 and/or the hinge assembly, and thus the door, to sag with respect to the door frame, the position of the threaded cap 52 can be adjusted within the respective hinge receptacle to adjust the position or oriented of the door connected to the hinge assembly 10. In other embodiments additional support washers (as described in more detail below) can be added within the hinge pin receptacles to correct the position and orientation of the hinge pin assembly and thus the door itself. Such incremental adjustments can also be implemented for instance if the hinge plates themselves fatigue over the time requiring positional correction. Such correction can thus help prolong the usable life of the internal bearing assemblies and or hinge plates before they would need complete replacement.

In still other embodiments, the first retention member 24 can extend through any of the hinge pin receptacles 14, 18, or 38 of a particular hinge assembly 10. Likewise the second retention member 30 can extend through any of the hinge pin receptacles 14, 18, or 38 of the hinge assembly 10. The first and second retention members 24 and 30 can extend through the same or different hinge pin receptacles 14, 18, or 38 in various embodiments. Additionally, while a single dowel pin 24 and a single set crew 30 are shown as retention members for the hinge assembly 10, in some embodiments, multiple dowel pins and multiple set screws can be extending into corresponding hinge pin receptacles to engage the hinge pin 20 or another component of the hinge assembly 20 that can provide retention forces indirectly onto the hinge pin 20, such as the cap 52. In some embodiments, a dowel pin 24 can be extended through each of the hinge pin receptacles 14, 18, and 38 and engaged with the hinge pin 20 for additional security.

While the open end 50 is shown in the second hinge pin receptacle 18 in FIGS. 1-5, the open end 50 can be defined in either of the outer hinge pin receptacles of a particular hinge assembly 10. For instance in embodiments with only two hinge pin receptacles, the open end 50 can be defined in either hinge pin receptacle. In those embodiments with three hinge pin receptacles, with a first hinge pin receptacle 14 positioned between second and third hinge pin receptacles 18 and 38, respectively, the open end 50 can be defined in either of the outer second or third hinge pin receptacles 18 and 38, and the cap 52 can be engaged with either the second or third hinge pin receptacles 18 and 38.

In some embodiments, the dowel pin 24 can have a dowel pin open end 40 extending into an internally threaded cavity 42 within the dowel pin 24. A dowel pin 24 with an internal threaded cavity 42 can allow the dowel pin 24 to be engaged when installed in the hinge assembly 10 via the threaded cavity 42 such that the dowel pin 24 can be removed and the hinge assembly 10 disassembled as needed. In some embodiments, a dowel set screw 54 can be threadingly engaged with the hole 34 in the first hinge pin receptacle 14 to help prevent the dowel pin 24 from dislodging from the first hinge pin receptacle 14 during use. To remove the dowel pin 24, the dowel set screw 54 can first be removed from hole 34 and the dowel pin 24 can then be removed via threaded internal cavity 42.

At least one bearing assembly 22 can be positioned between the hinge pin 20 and one of the hinge pin receptacles 14, 18, or 38. In some embodiments, a bearing assembly 22 can be positioned between each end 23 of the hinge pin 20 and the adjacent hinge pin receptacle. In the embodiment of FIGS. 1-5, a bearing assembly 22 is positioned between the ends 23 of hinge pin 20 and the second and third hinge pin receptacles 18 and 38. The bearing assemblies 22 can be any suitable bearing assembly that can facilitate movement of the hinge pin 20 relative to the hinge pin receptacles 14, 18, and/or 38, and thus movement between first and second hinge plates 12 and 16 about hinge pin 20.

Figure 3:
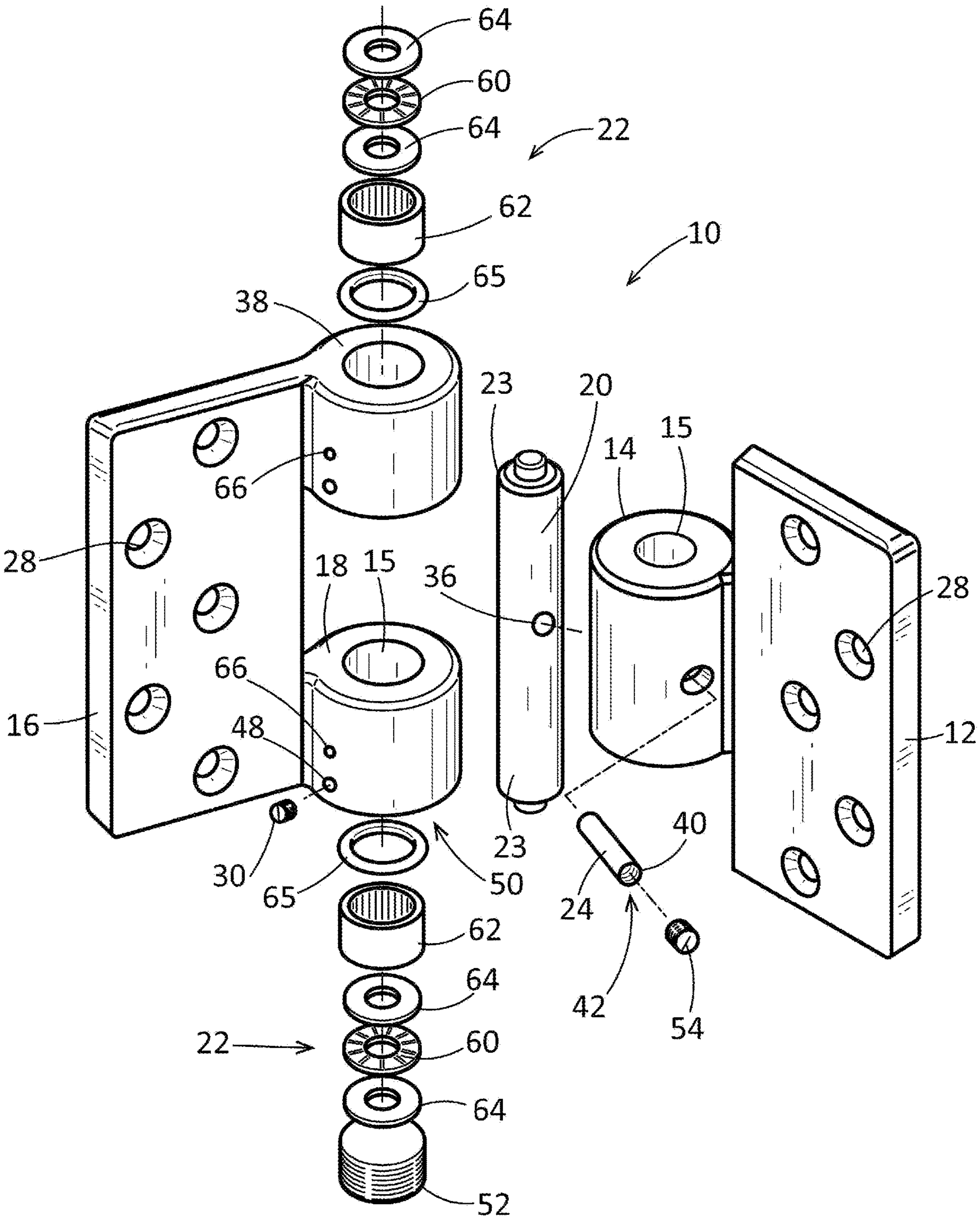
FIG. 3 is an exploded view of the hinge assembly of FIG. 1.
Figure 4:
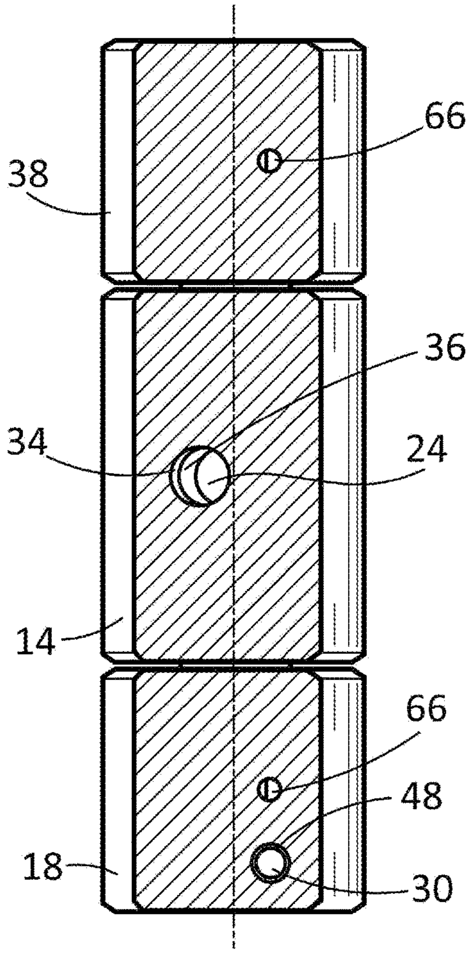
FIG. 4 is a cross sectional view of a joint and hinge pin receptacles of the hinge assembly of FIG. 1.
Figure 5:
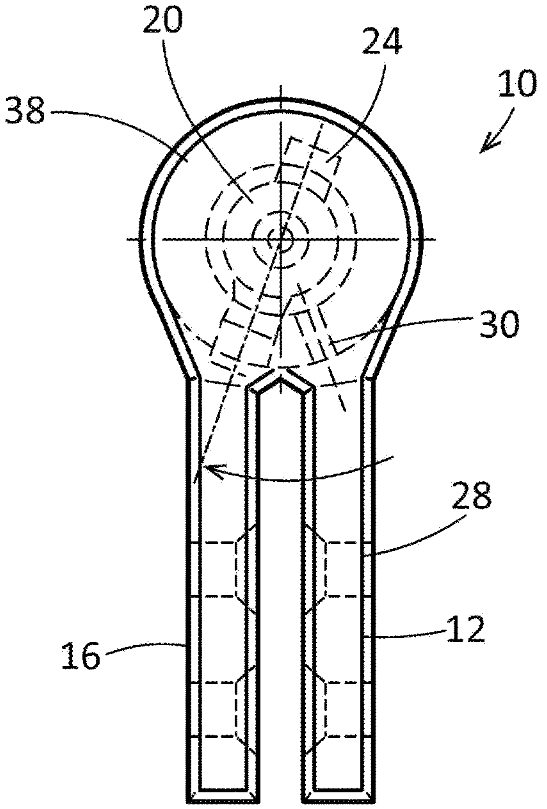
FIG. 5 is a top view of the hinge assembly of FIG. 1.
Figure 6:
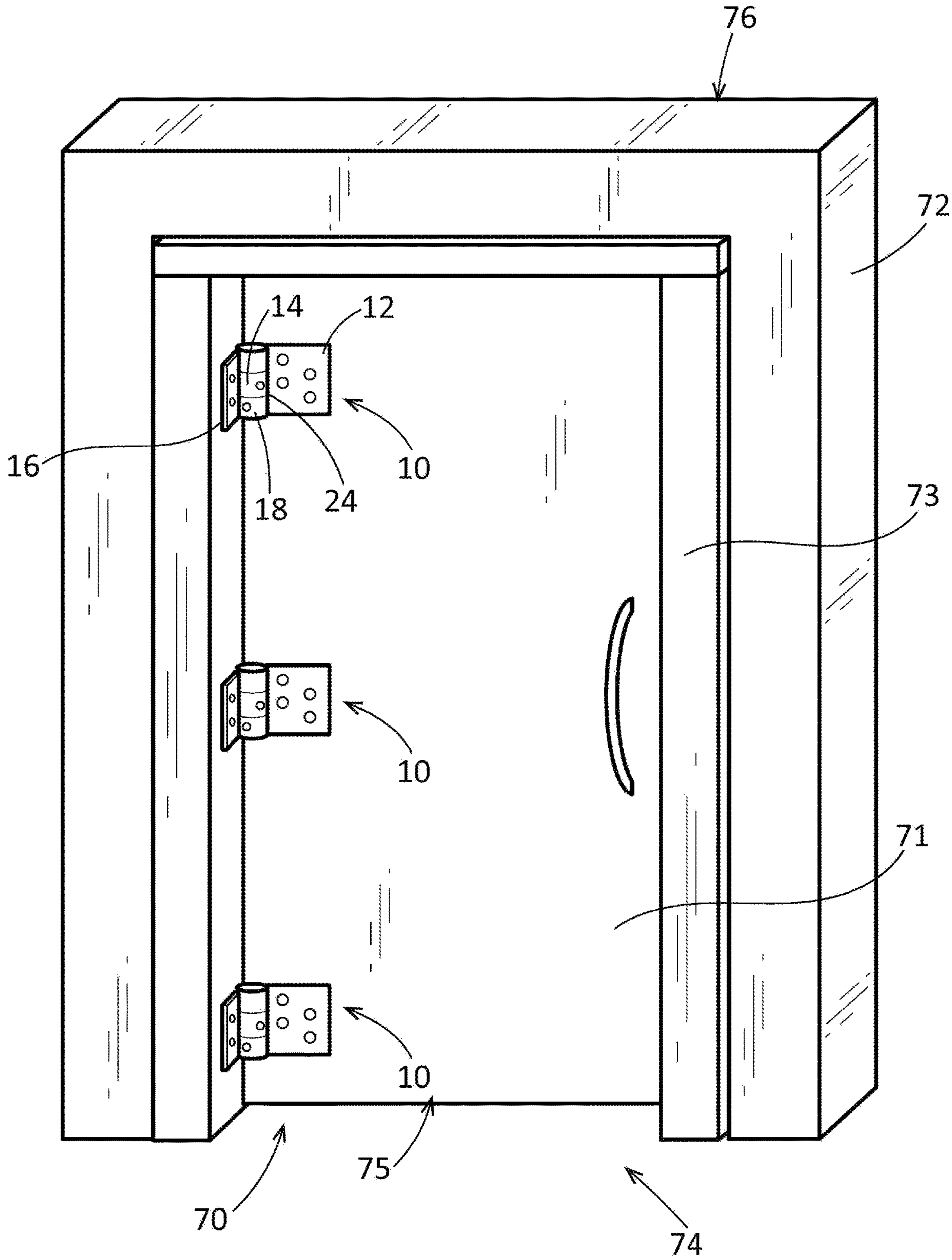
FIG. 6 is a perspective view of an embodiment of a security door assembly installed within a building, the security door having an improved hinge assembly.

In some embodiments, as shown in FIG. 3, the bearing assemblies 22 can include a roller bearing 60 and/or a roller bearing ring 62 into which an end 23 of the hinge pin 20 can be positioned or seated. The roller bearing 60 can engage, either directly or indirectly, a distal surface of the end 23 of the hinge pin 20 and the roller bearing ring 62 can engage the side walls of the hinge pin 20 to allow the hinge pin 20 to rotate smoothly within the roller bearing 60 and/or roller bearing ring 62 via the rollers in the bearing assembly 22. Grease can be provided as a lubricant for the bearing assembly 22, and an oil seal 65 can be positioned on or around the end 23 of the hinge pin 20 to retain the grease or other lubrication between the roller bearing ring 62 and the hinge pin 20. The bearing assembly 22 can also include one or more washers 64 positioned between the hinge pin 20, cap 52, and/or the corresponding hinge pin receptacle 14, 18, or 38, and the roller bearing 60 to facilitate smooth interaction between the end 23 of the hinge pin 20, the cap 52, the corresponding hinge pin receptacle 14, 18 or 38, and/or the roller bearing 60. In some embodiments, the hinge pin receptacles adjacent the bearing assemblies, for instance second and third hinge pin receptacles 18 and 38 in FIGS. 1-5, can include an air vent 66 positioned adjacent each bearing assembly 22.

In conventional hinge assemblies, the components of the internal bearing assemblies can often be the parts that fail or wear out over time and need to be replaced to ensure proper functioning of the security door. With conventional, integrally formed hinges, wearing out of the bearing assembly components would require the entire hinge assemblies to be replaced at considerable costs and time. For instance, it can take several weeks to fabricate an entirely new hinge, which can leave the security door in a condition where it is not working properly or vulnerable to blast, ballistic or forced entry events for an extended period of time.

The one or more removable retention members 24 and/or 30 incorporated into the hinge assembly of the present disclosure can allow the hinge assembly 10 to be disassembled as needed, for instance when a seal or bearing of the bearing assembly 22 wears out over time. A supply of these less expensive parts can be kept on site and the worn out part can be quickly and conveniently replaced. The one or more retention members 24 and 30 can be removed, as well as the cap 52, and the hinge pin 20 and the bearing assemblies 22 can be removed from the hinge pin receptacles 14, 18, and 38. The worn components of the bearing assembly 22 can be replaced and the hinge assembly 10 can be reassembled to place the security door back in proper functioning operation. This repair can be done very quickly and at a much lower cost than replacing the entire hinge assembly, as is required for conventional security door hinge assemblies.

As shown in FIGS. 1-6, another aspect of the present disclosure is a security door assembly 70 for installation on a building 72 having an interior 74 and an exterior 76. The security door apparatus 70 can include a door frame 73 mountable to the building 72, and a security door 71 positionable within the door frame 73, the security door having an interior side 75 oriented toward the interior 74 of the building 72 and an exterior side (opposite Interior side 75) oriented toward the exterior 76 of the building 72 when the door frame 73 is mounted to the building 72 and the security door 71 is positioned within the door frame 73. The security door assembly 72 can include at least one hinge assembly 10 coupled between the door frame 73 and the interior side 74 of the security door 71 such that security door 71 is pivotable on the door frame 73 via the at least one hinge assembly 10 between an open orientation and a closed orientation.

The hinge assembly 10 can include a first hinge plate 12 coupled to the door 71, the first hinge plate 12 having at least a first hinge pin receptacle 14 extending from the first hinge plate 12, and a second hinge plate 16 coupled to the door frame 73 having at least a second hinge pin receptacle 18 extending from the second hinge plate 16. A hinge pin 20 can be removably received in a longitudinal direction within the first and second hinge pin receptacles 14 and 18. A bearing assembly 22 can be disposed between the hinge pin 20 and one of the first or second hinge pin receptacles 14 and 18. A retention member 24 can removably extend in a first lateral direction into one of the first or second hinge pin receptacles 14 or 18 and engage the hinge pin 20.

As shown in FIGS. 1-3 and 6, another aspect of the present disclosure is a method of installing a hinge assembly 10 on a security door 70, including the steps of providing a hinge assembly 10 including: a first hinge plate 12 having at least a first hinge pin receptacle 14 extending from the first hinge plate 12; and a second hinge plate 16 having at least a second hinge pin receptacle 18 extending from the second hinge plate 16; a hinge pin 20 removably received in a longitudinal direction within the first and second hinge pin receptacles 14 and 18 such that the first and second hinge plates 12 and 16 are pivotal with respect to one another via the hinge pin 20; a bearing assembly 22 disposed between the hinge pin 20 and one of the first or second hinge pin receptacles 14 and 18; and a retention member 24 removably extended in a first lateral direction into one of the first or second hinge pin receptacles 14 or 18 and engaged with the hinge pin 20; positioning a security door 71 within a door frame 73, the security door 71 having an interior side 75 and an exterior side; and securing the hinge assembly 10 to the door frame 73 and the interior side 75 of the security door 71 such that the hinge assembly 10 is not accessible from the exterior side of the security door 71 when the security door 71 is in a closed position. In some embodiments, the method can further comprise positioning the hinge assembly 10 such that the retention member 24 is accessible from an interior side of the door 71. Certain security door standards, including those imposed for U.S. embassies by the United States government, do not allow hinge assemblies to be removably accessible from an exterior side of the door. Having the hinge assembly positioned on an interior side of the door can help the hinge assembly comply with these safety standards, while also allowing the retention member to be accessible for removal and replacement of the hinge pin 20, internal bearings assemblies, or other internal components of the hinge assembly 10.

Thus, although there have been described particular embodiments of the present invention of a new and useful IMPROVED HINGE ASSEMBLY FOR SECURITY DOOR, it is not intended that such references be construed as limitations upon the scope of this invention.

What is claimed is:

1. A hinge assembly for a security door, the hinge assembly comprising:
- a first hinge plate having at least a first hinge pin receptacle extending from the first hinge plate;
- a second hinge plate having at least a second hinge pin receptacle extending from the second hinge plate and a third hinge pin receptacle extending from the second hinge plate in the same direction as the second hinge pin receptacle, the first hinge pin receptacle positioned between the second and third hinge pin receptacles, wherein the second and third hinge pin receptacles each include at least one air vent;
- a hinge pin removably received in a longitudinal direction within the first and second hinge pin receptacles such that the first and second hinge plates are pivotal with respect to one another via the hinge pin;
- a bearing assembly disposed between the hinge pin and one of the first or second hinge pin receptacles; and
- a first retention member removably extending in a first lateral direction into one of the first or second-hinge pin receptacles and engaging the hinge pin.

2. The hinge assembly of claim 1, further comprising:
- the first retention member removably extending in the first lateral direction into the first hinge pin receptacle and engaging the hinge pin, and
- a second retention member removably extending in a second lateral direction into either the first or second hinge pin receptacle.

3. The hinge assembly of claim 2, wherein the first retention member is a dowel pin extending at least partially through the hinge pin and the first hinge pin receptacle, and the second retention member is a set screw operable to threadingly engage the first or second hinge pin receptacle.

4. The hinge assembly of claim 3, wherein the dowel pin has a dowel pin open end extending into an internally threaded cavity within the dowel pin.

5. The hinge pin assembly of claim 3, wherein the dowel pin is extendable through the first or second hinge pin receptacle, through the hinge pin, and into an opposing side of the first or second hinge pin receptacle.

6. The hinge assembly of claim 1, wherein either the first hinge pin receptacle or the second hinge pin receptacle has an open end, and the hinge assembly further comprises a cap threadingly engageable with the open end of the first or second hinge pin receptacles.

7. The apparatus of claim 1, wherein:
- the first hinge plate and the first hinge pin receptacle are integrally molded or cast together; and
- the second hinge plate and the second hinge pin receptacle are integrally molded or cast together.

8. The apparatus of claim 1, further comprising:
- a first bearing assembly disposed between a first end of the hinge pin and one of the first or second hinge pin receptacles; and
- a second bearing assembly disposed between a second end of the hinge pin and one of the first or second hinge pin receptacles.

9. A hinge assembly for a security door, the hinge assembly comprising:
- a first hinge plate having a first hinge pin receptacle extending from the first hinge plate;
- a second hinge plate having a second hinge pin receptacle and a third hinge pin receptacle extending from the second hinge plate, the first hinge pin receptacle receivable between the second and third hinge pin receptacles;
- a hinge pin removably received in a longitudinal direction within the first, second, and third hinge pin receptacles such that the first and second hinge plates are pivotal with respect to one another via the hinge pin;
- a first bearing assembly disposed between a first end of the hinge pin and the first hinge pin receptacle;
- a second bearing assembly disposed between a second end of the hinge pin and the third hinge pin receptacle;
- a cap threadingly engaged with the second hinge pin receptacle to allow for selective removal of the hinge pin and the bearing assemblies from within the first, second, and third hinge pin receptacles; and
- a first retention member removably extending in a first lateral direction into one of the first or second hinge pin receptacles and engaging the hinge pin,
- wherein the second and third hinge pin receptacles each include at least one air vent.

10. The hinge assembly of claim 9, wherein the first retention member further comprises a set screw operable to threadingly engage the first or second hinge pin receptacle and abut the hinge pin.

11. The hinge assembly of claim 9, further comprising:
- the first retention member is a dowel pin extending at least partially through the hinge pin and the first hinge pin receptacle, and
- a second retention member is a set screw operable to threadingly engage the first or second hinge pin receptacle.

12. The hinge assembly of claim 11, further including a dowel set screw threadingly engagable with the first hinge pin receptacle to retain the dowel pin within the hinge pin and the first hinge pin receptacle.

13. The apparatus of claim 9, wherein:
- the first hinge plate and the first hinge pin receptacle are integrally molded or cast together; and
- the second hinge plate and the second and third hinge pin receptacles are integrally molded or cast together.

14. A security door assembly for installation on a building having an interior and an exterior, the security door apparatus comprising:
- a door frame mountable to the building;
- a security door positionable within the door frame, the security door having an interior side and an exterior side when the door frame is mounted to the building and security door is positioned within the door frame; and at least one hinge assembly coupled between the door frame and the security door such that the security door is pivotable on the door frame via the at least one hinge assembly between an open orientation and a closed orientation, the hinge assembly comprising:

a first hinge plate having at least a first hinge pin receptacle extending from the first hinge plate;

a second hinge plate having at least a second hinge pin receptacle extending from the second hinge plate and a third hinge pin receptacle extending from the second hinge plate in the same direction as the second hinge pin receptacle, the first hinge pin receptacle positioned between the second and third hinge pin receptacles, wherein the second and third hinge pin receptacles each include at least one air vent;

a hinge pin removably received in a longitudinal direction within the first and second hinge pin receptacles;

a bearing assembly disposed between the hinge pin and one of the first or second hinge pin receptacles; and a retention member removably extending in a first lateral direction into one of the first or second hinge pin receptacles and engaging the hinge pin.

15. The security door assembly of claim 14, wherein the retention member is a first retention member, and the security door assembly further comprises a second retention member removably extending in a second lateral direction into either the first or second hinge pin receptacle.

16. The security door assembly of claim 15, wherein the first retention member is a dowel pin extendable through the first hinge pin receptacle, through the hinge pin, and at least partially into an opposing side of the hinge pin receptacle, and the second retention member is a set screw operable to threadingly engage the first or second hinge pin receptacle and abut the hinge pin.

17. A hinge assembly for a security door, the hinge assembly comprising:

a first hinge plate having at least a first hinge pin receptacle extending from the first hinge plate;

a second hinge plate having at least a second hinge pin receptacle extending from the second hinge plate;

a hinge pin removably received in a longitudinal direction within the first and second hinge pin receptacles such that the first and second hinge plates are pivotal with respect to one another via the hinge pin;

a bearing assembly disposed between the hinge pin and one of the first or second hinge pin receptacles; and a first retention member removably extending in the first lateral direction into the first hinge pin receptacle and engaging the hinge pin, and a second retention member removably extending in a second lateral direction into either the first or second hinge pin receptacle, wherein the first retention member is a dowel pin extending at least partially through the hinge pin and the first hinge pin receptacle, and the second retention member is a set screw operable to threadingly engage the first or second hinge pin receptacle, wherein the dowel pin has a dowel pin open end extending into an internally threaded cavity within the dowel pin.

18. A hinge assembly for a security door, the hinge assembly comprising:

a first hinge plate having at least a first hinge pin receptacle extending from the first hinge plate;

a second hinge plate having at least a second hinge pin receptacle extending from the second hinge plate;

a hinge pin removably received in a longitudinal direction within the first and second hinge pin receptacles such that the first and second hinge plates are pivotal with respect to one another via the hinge pin;

a bearing assembly disposed between the hinge pin and one of the first or second hinge pin receptacles;

a first retention member removably extending in a first lateral direction into the first hinge pin receptacle and engaging the hinge pin; and a second retention member removably extending in a second lateral direction into either the first or second hinge pin receptacle, wherein the first retention member is a dowel pin extending at least partially through the hinge pin and the first hinge pin receptacle, and the second retention member is a set screw operable to threadingly engage the first or second hinge pin receptacle, wherein the dowel pin is extendable through the first hinge pin receptacle, through the hinge pin, and into an opposing side of the first hinge pin receptacle.

19. A hinge assembly for a security door, the hinge assembly comprising:

a first hinge plate having a first hinge pin receptacle extending from the first hinge plate;

a second hinge plate having a second hinge pin receptacle and a third hinge pin receptacle extending from the second hinge plate, the first hinge pin receptacle receivable between the second and third hinge pin receptacles;

a hinge pin removably received in a longitudinal direction within the first, second, and third hinge pin receptacles such that the first and second hinge plates are pivotal with respect to one another via the hinge pin;

a first bearing assembly disposed between a first end of the hinge pin and the first hinge pin receptacle;

a second bearing assembly disposed between a second end of the hinge pin and the third hinge pin receptacle;

a cap threadingly engaged with the second hinge pin receptacle to allow for selective removal of the hinge pin and the bearing assemblies from within the first, second, and third hinge pin receptacles;

a first retention member removably extending in a first lateral direction into the first hinge pin receptacle and including a dowel pin extending at least partially through the hinge pin and the first hinge pin receptacle and engaging the hinge pin;

a second retention member including a set screw operable to threadingly engage the first or second hinge pin receptacle; and a dowel set screw threadingly engagable with the first hinge pin receptacle to retain the dowel pin within the hinge pin and the first hinge pin receptacle.

20. A security door assembly for installation on a building have an interior and an exterior, the security door apparatus comprising:

a door frame mountable to the building;

a security door positionable within the door frame, the security door having an interior side and an exterior side when the door frame is mounted to the building and the security door is positioned within the door frame; and at least one hinge assembly coupled between the door frame and the security door such that the security door is pivotable on the door frame via the at least one hinge assembly between an open orientation and a closed orientation, the hinge assembly comprising:

a first hinge plate having at least a first hinge pin receptacle extending from the first hinge plate;

a second hinge plate having at least a second hinge pin receptacle extending from the second hinge plate;

a hinge pin removably received in a longitudinal direction within the first and second hinge pin receptacles;

a bearing assembly disposed between the hinge pin and one of the first or second hinge pin receptacles;

a first retention member removably extending in a first lateral direction into one of the first or second hinge pin receptacles and engaging the hinge pin; and a second retention member removably extending in a second lateral direction into either the first or second hinge pin receptacle, wherein the first retention member is a dowel pin extendable through the first hinge pin receptacle, through the hinge pin, and at least partially into an opposing side of the hinge pin receptacle, and the second retention member is a set screw operable to threadingly engage the first or second hinge pin receptacle and abut the hinge pin.

* * * * *